United States Patent
Holt (10) Patent No.: US 8,028,948 B1
(45) Date of Patent: Oct. 4, 2011

(54) FISHING LINE CONTROL SYSTEM

(75) Inventor: Robert Holt, Dillon, MT (US)

(73) Assignee: Fly Fishing Xtreme, LLC, Simi Valley, CA (US)

( * ) Notice: Subject to any disclaimer, the term of this patent is extended or adjusted under 35 U.S.C. 154(b) by 0 days.

(21) Appl. No.: 12/505,271

(22) Filed: Jul. 17, 2009

Related U.S. Application Data (60) Provisional application No. 61/200,327, filed on Nov. 28, 2008.

(51) Int. Cl.
*A01K 89/01* (2006.01)
(52) U.S. Cl. .......................... 242/323; 242/322
(58) Field of Classification Search .................. 242/322, 242/323
See application file for complete search history.

(56) References Cited

U.S. PATENT DOCUMENTS

| | | | |
|---|---|---|---|
| 2,514,697 A | 1/1948 | Ellis | |
| 2,875,963 A | 3/1959 | Collins | |
| 4,137,694 A | 2/1979 | Hopper | |
| 2006/0000862 A1 | 1/2006 | Kawano | |
| 2006/0156889 A1 | 7/2006 | Johnson | |
| 2008/0196254 A1* | 8/2008 | Bessinger | 30/276 |
| 2008/0203207 A1* | 8/2008 | Krauland et al. | 242/287 |

* cited by examiner

*Primary Examiner* — Emmanu M Marcelo
(74) *Attorney, Agent, or Firm* — Lewis and Roca LLP (57) ABSTRACT

A fishing spool line control system includes a cutter housing attached to an annular elastic cloth band that fits around and covers fishing line on a spool. Fishing line, such as tippet, is fed from the spool through a hole in the rear of the cutter housing, and is cut to desired length by a blade in the front of the cutter housing. A thumb rest behind the blade allows pressure to be placed on the cutter housing, allowing safer, easier, and more accurate cutting of the fishing line.

20 Claims, 9 Drawing Sheets

FISHING LINE CONTROL SYSTEM

CROSS-REFERENCE TO RELATED APPLICATIONS

This application claims priority to U.S. Provisional Patent Application Ser. No. 61/200,327, filed Nov. 28, 2008, the entirety of which is incorporated by reference herein.

BACKGROUND OF THE INVENTION

1. Field of the Invention

The present invention generally relates to fishing apparatus and, more specifically, to a fishing line control system for safely and efficiently dispensing and cutting fishing line to a desired length.

2. The Prior Art

At one time, fly fishermen utilized simple leaders to attach their flies to the fishing line. The leader was typically transparent with a lower breaking strength than the fishing line to which it was attached. Some leader floated, and other leader sank, depending on the type of fishing involved.

More recently, tapered leaders have become popular. Commercially packaged leaders, typically 7 to 15 feet in length, are typically designed with the ever-popular floating line in mind. The thin dense sinkers seldom require a leader over 6-feet, if that, and the taper matters much less than for floating line. Commercially manufactured "knotless" leaders typically have standard tippet diameters.

The tippet is part of the leader. It is the finite part of the leader assembly. As such, the tippet joins the all important fly to the rest of the system. The tippet is typically the last 15-inches or so of the leader at the very minimum. The tippet can be longer, but if it is less than 15-inches, it may cost a fisherman a record under the IGFA rules. Leaders are made in varied lengths, in varied diameters and of varied material. Nothing is constant in leader selection other than the water being fished and the chosen fly.

Short of a special order, almost all commercially available leaders are "knotless." This means that fisherman typically will buy a leader whose taper is continuous from the butt diameter to the diameter of the tippet—in other words, no knots from thick to thin. Technology enables a manufacturer to set the specific taper in incremental diameters extruded mechanically or chemically. The packaging will typically clearly indicate (1) the sizing for "X" and, (2) the breaking strength of the tippet. Importantly, these ratings apply only to the tippet, not the leader butt or body that are considerably thicker. For most freshwater fly fishers, the commercial knotless leader, with its built-in tippet, does an adequate job.

Besides sizing for "X," another thing of concern to the fly fisher is the leader length and the breaking strength of the tippet. Commercially packaged leaders typically are available in lengths from 7 to 15-feet. The longer the leader, the more difficult it typically is to control the leader during a cast; while the shorter the leader, the greater the likelihood of spooking fish. For many people, a 9-feet leader is a reasonably good compromise. In stained or cloudy waters, a 7-feet leader may be adequate. For many, the shorter the leader that enables a fisherman to catch fish, the better.

The advancement in leader manufacturing has kept pace with the advancements in fly lines. Monofilament line has been continuously improved for over twenty years. However, other materials are beginning to become important. Manufacturers now have a wide choice in materials when fabricating leaders. As a result, leaders today can range from very stiff to very supple. In fact, there seems to be a leader for just about anything a fisherman could possibly want to do on the water.

Beginning fly fishermen typically start with a leader made of conventional monofilament. As long as the leader is sized for "X," almost any leader will prove satisfactory as he refines his fly fishing skills. Down the road, the differences in leader materials might become significant, especially when the fly fisherman begins fishing different waters and chasing different species of fish. Note that the leader performs two tasks critical to success in catching fish. First, during the cast the leader transmits power from the line to the fly. Second, in or on the water, the leader is the shield of invisibility for a fly line.

As a general guide, the butt section of the leader typically accounts for 40% to 60% of the total length of the leader; and the midsection, or tapered body, another 20% to 40%. The tippet makes up the remainder of the leader. One thing that is important about the percentages of butt, midsection, and tippet, is the taper that maximizes the uninterrupted flow of energy from the line to the fly. If the flow of energy from rod to fly is not right, the fishing rig will often not perform properly in making the cast or turning over the fly in the final presentation.

A problem often arises with standard fishing leaders. As a fly fisher ties-on fly after fly, the tippet quickly disappears. The odds are, however, that the leader butt and the midsection remain in good shape. Rather than replacing the entire leader, one solution is to tie-on a new piece of monofilament line and then continue fishing. Tying-on a new tippet typically only requires tying one of two knots. One advantage of tying-on tippet is that fly fishing need not be any more expensive than spinning and bait-casting.

There are also times when the commercial knotless leader will not conform to a fly fisherman's want list of things he expects it to do. One example is wind fighting. For example, a fisherman may be having trouble making the cast because the leader cannot face the wind. If the fly fisherman has already shortened the leader, the problem could be the diameter of the leader butt. Many commercial leaders have a leader butt approximately 0.023" in diameter. That is typically acceptable under normal conditions, but not in the wind. It is not surprising that a single leader butt, for example 0.023" in diameter, often will not satisfy the needs of lines ranging from 5 to 10-weight. This is another place where tying-on tippet to the end of the leader can be advantageous.

Thus, for a number of reasons discussed above, many fly fishermen find that they prefer tying their own tippet to the rest of their leader. One problem that arises though is that this often becomes messy and error prone. Often, removing tippet from a spool can result in the rest of the tippet on the spool becoming fouled. Also, it is often hard to properly size tippet, especially in the conditions faced in the midst of fly fishing. It would therefore be advantageous to have a mechanism available to those tying their own tippet that would keep the remaining tippet on the spool from fouling, while allowing the fly fisher to be able to accurately, repeatedly, and safely extract the desired length of tippet from a spool, even in the worst conditions.

BRIEF SUMMARY OF THE INVENTION

A fishing spool line control system includes a cutter housing attached to an annular elastic cloth band that fits around and covers fishing line on a spool. Fishing line, such as tippet, is fed from the spool through a hole in the rear of the cutter housing, and is cut to desired length by a blade in the front of the cutter housing. A thumb rest behind the blade allows pressure to be placed on the cutter housing, allowing safer, easier, and more accurate cutting of the fishing line.

DETAILED DESCRIPTION

An annular elastic band fits most spools of fish line and fits snugly around the spool of line for easy extraction of the fishing line. A cutter housing can cut line the same length every time it is used. The cutter housing is preferably sleek and low profile for maximum ratability. The cutter housing can also adjust the fishing line length by pushing the cutter housing in one directly for longer line retrieval or the other direction for shorter line retrieval. The cutter housing preferably has a partially concealed vertically oriented blade and guide tab for optimum cutting. The cutter housing is preferably contoured on top for thumb rest to hold down fishing line while it is being cut. The cutter housing only exposes the fishing line to the blade and not hands or fingers. The cutter housing is safe to use and will not injure or cut the fisherman. With the cutter housing in-between the spool flanges, one is able to lock multiple spools together and still be able to cut the fishing line with the blade. The cutter housing is lightweight and out-of-the-way of any interference of the fisherman. The cutter housing also protects the fishing line from falling through the eyelet, where the fisherman has a hard time recovering it.

The present invention was primarily designed to provide for the safer, easy, and accurate cutting and dispensing of tippet, which is the thin end of the leader to which flies are attached for fly fishing. However, the present invention is applicable for cutting and dispensing other types of fishing line.

Figure 1:
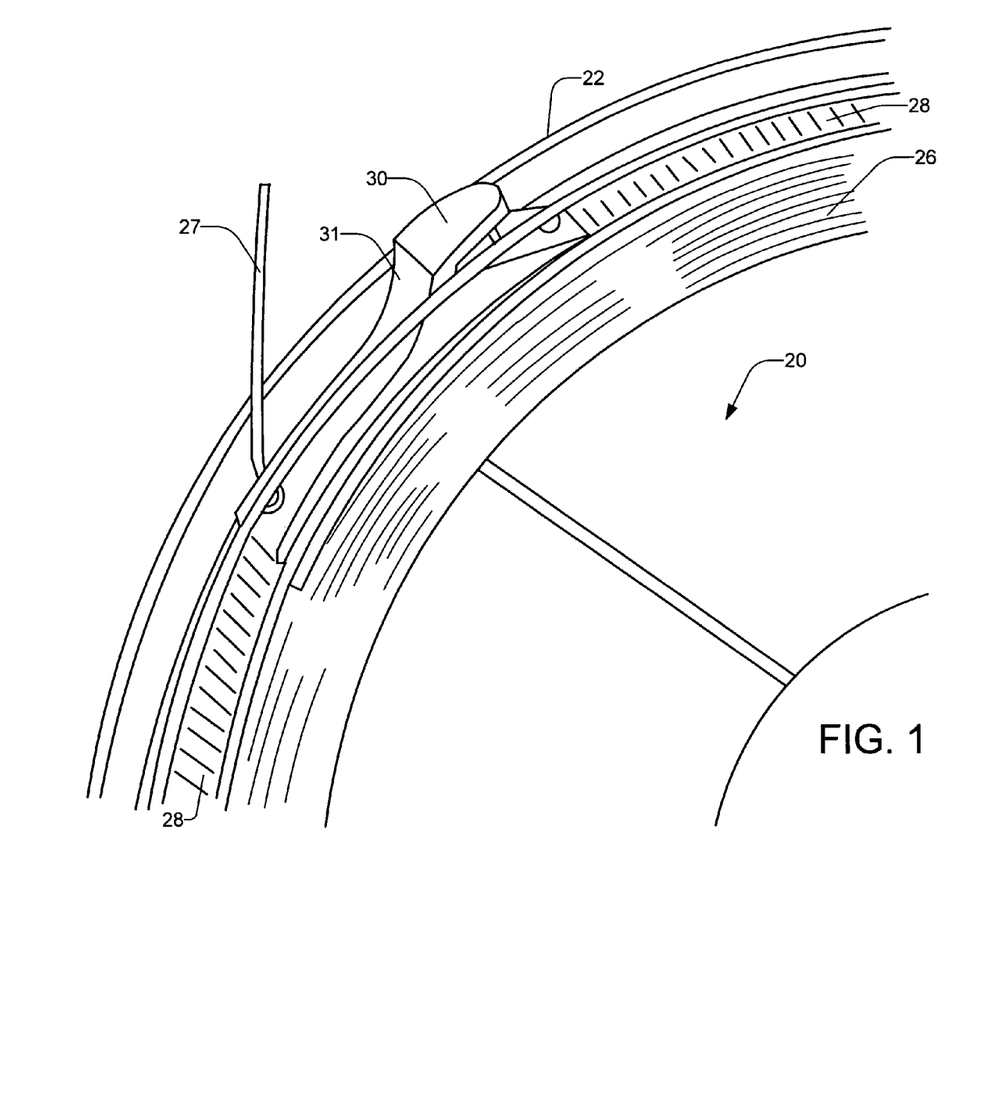
FIG. 1 is a perspective cutaway view of one embodiment of the present invention, installed on a spool of fishing line.

FIG. 1 is a perspective cutaway view of one embodiment of the present invention, installed on a spool 20 of fishing line 26. A cutter housing 30 is connected to an annular elastic band 28 that fits over the spool 20 and within the rim or flanges 22 of the spool 20 of fishing line 26. The free end 27 of the fishing line 26 extends through a hole in the back of the cutter housing 30 from the spool 20 of fishing line 26.

The combined band 28 and attached cutter housing 30 wrap around and cover the fishing line 26 on the spool 20. The free end of the fishing line 27 is threaded through a attachment means 37 that attaches the cutter 30 to the annular elastic band 28. The front of the cutter housing 30 is also connected to the elastic band 28 using a second attachment means 36 in the front. A vertically oriented cutting blade 32 is shown partially hidden or concealed by the cutter housing 30, with the portion of the blade 32 located within the cutter housing 30 shown with dotted lines in FIG. 3. The free end of the fishing line 27 can be pulled through the opening containing the partially concealed cutting blade 32, prior to cutting the fishing line 27 to the required length.

Figure 2:
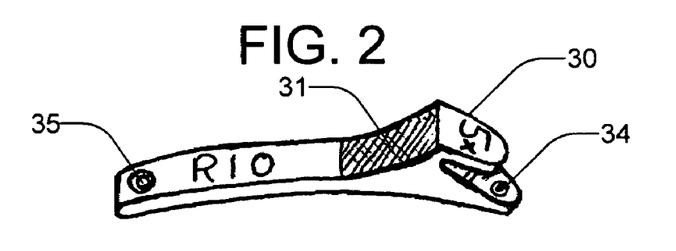
FIG. 2 is a perspective view of the cutter housing shown in FIG. 1.

FIG. 2 is a perspective view of the cutter housing 30 shown in FIGS. 1 and 2. The cutter housing 30 has a dented and cross-hatched thumb rest 31 behind the cutting blade, allowing for better leverage and safer cutting of fishing line. Also shown are the front attachment hole 34 and rear attachment hole 35 that are used to attach the cutter housing 30 to the annular elastic band with attachment means 36, 37, as shown in FIG. 3.

Figure 3:
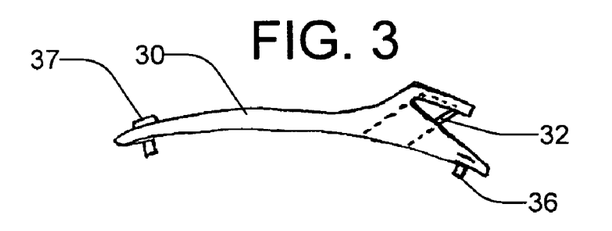
FIG. 3 is a side cutaway view of the cutter housing shown in FIG. 1.

FIG. 3 is a side cutaway view of the cutter housing shown in FIGS. 1 and 2 showing front 36 and rear 37 attachment means inserted through the two attachment holes 34, 35. The attachment means 36, 37 may be hollow rivets, crimped metal (e.g. brass or stainless steel) cylinders, or other means of attaching the cutter housing 30 to the annular elastic band 28. The rear attachment means 37 is preferably hollow, allowing the free end 27 of the fishing line 26 to pass or feed through it and the elastic band 28. The front attachment means 36 may be hollow, in order to more efficiently manufacture the invention, but need not be, since the fishing line preferably feeds through the rear attachment means 37 instead.

The partially concealed cutting blade 32 is shown, and the portion of it inside the cutter housing 30 is shown as dashed lines. In this embodiment, the top of the cutter housing extends out over the top of the cutting blade 32, forming a opening large enough for the fishing line, but too small for a finger or other body part, resulting in safer operation than found in the prior art. Also, while a vertically oriented cutting blade 32 is shown in this FIG., other orientations of the cutting blade are also within the scope of the present invention.

Figure 4:
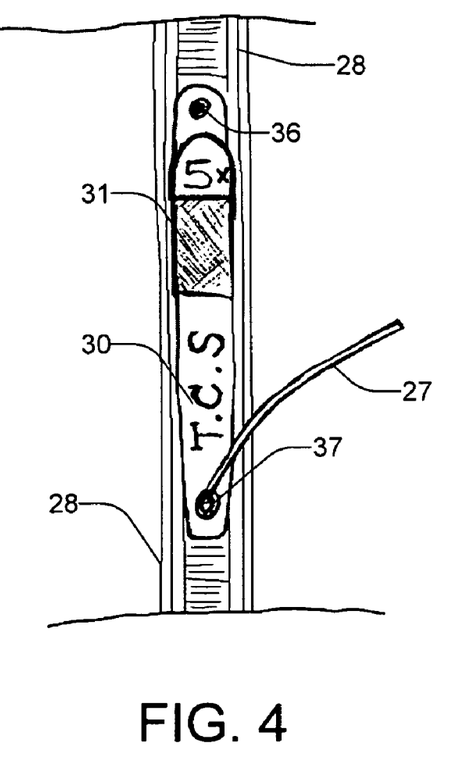
FIG. 4 is a top view of the cutter housing shown in FIG. 1 installed onto the annular elastic band.

FIG. 4 is a top view of the cutter housing 30 shown in FIG. 1 installed onto the annular elastic band 28, with the free end of the fishing line 27 extending through the rear attachment means 37. Also visible are the front attachment means 36 and the thumb rest 31.

Figure 5:
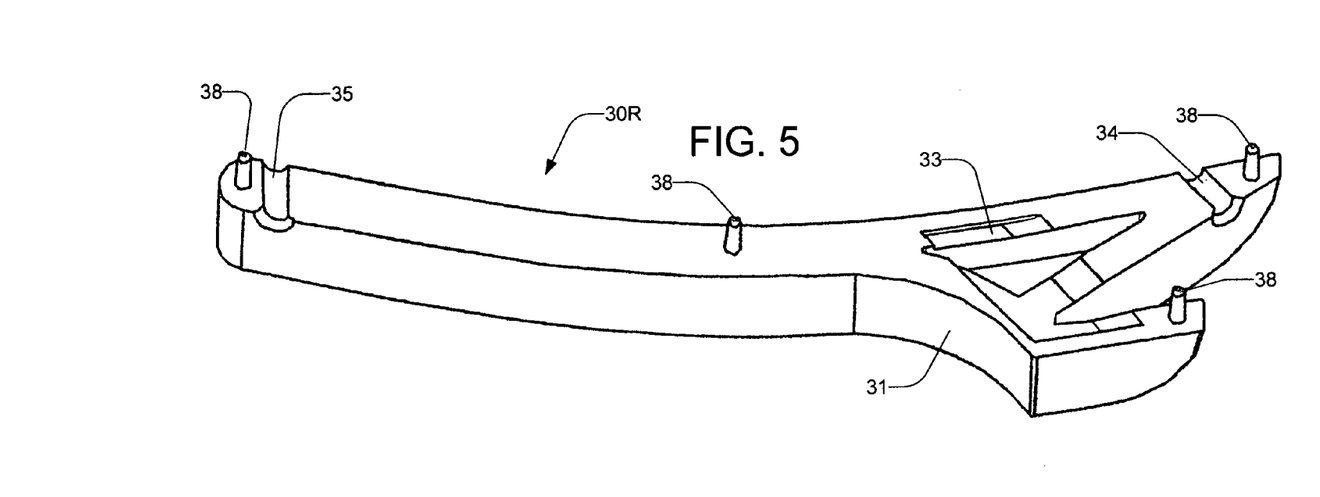
FIG. 5 is a perspective view of the right half of the body of a cutter housing, in accordance with one embodiment of the present invention.

FIG. 5 is a perspective view of the right half 30R of the body of a cutter housing 30, in accordance with one embodiment of the present invention. Shown in this FIG. are the front and rear attachment holes 34, 35, the thumb rest 31, an opening 33 for insertion and installation of a cutting blade 32, as well as a set of tabs 38 used to connect this half to the corresponding left half 30L.

Figure 6:
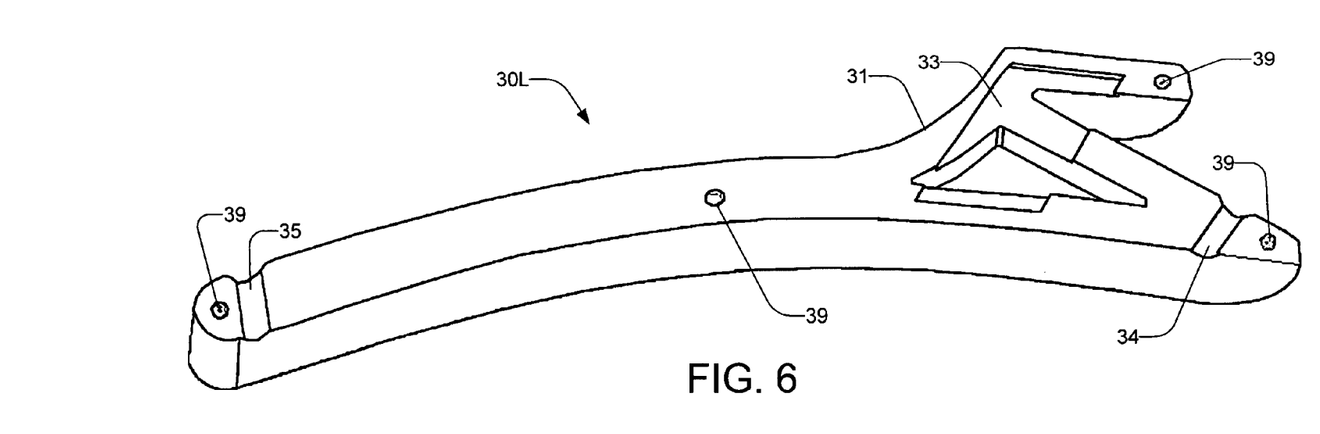
FIG. 6 is a perspective view of the left half of the body of a cutter housing, in accordance with the embodiment shown in FIG. 5.

FIG. 6 is a perspective view of the left half 30L of the body of a cutter housing 30, in accordance with the embodiment shown in FIG. 5. It differs from the right half 30R, in that it contains detents 39 into which the tabs 38 can be inserted, in order to assemble the two halves, along with the cutting blade 32 (not shown) into an assembled cutter housing 30.

The cutter housing 30 shown here is constructed of a plastic material. Many different attachment means can be utilized to attach the two halves of the cutter housing 30 together, including different types of glue. Other materials are also within the scope of the present invention, such as metal, and attachment and construction typically depend on the material from which the cutter housing 30 is constructed. Also, while tabs 38 and detents 39 are shown here, other attachment means are also within the scope of this invention.

Figure 7:
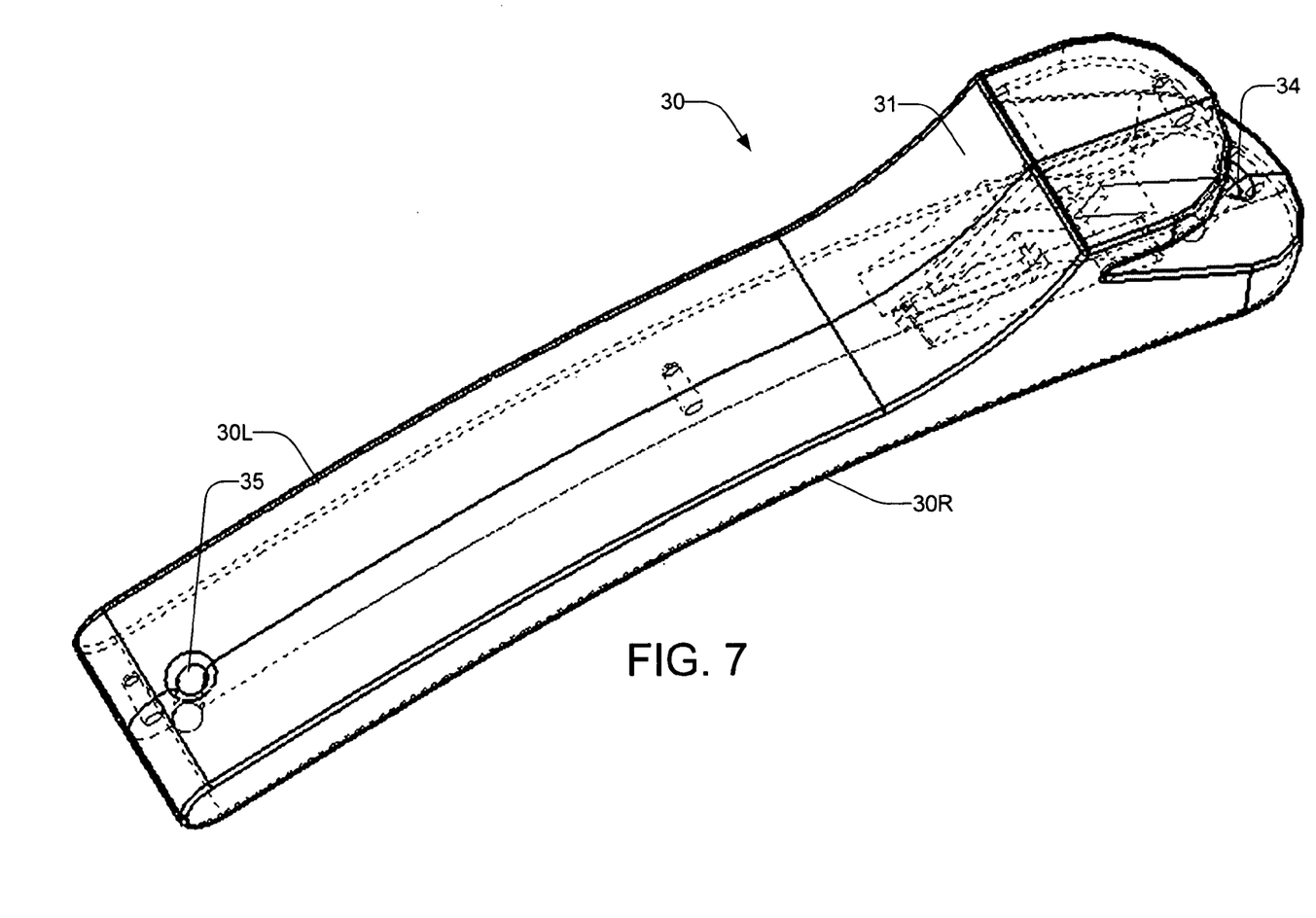
FIG. 7 is a perspective cutaway view of an assembled cutter housing, in accordance with the embodiment shown in FIGS. 5 and 6.

FIG. 7 is a perspective cutaway view of an assembled cutter housing 30, in accordance with the embodiment shown in FIGS. 5 and 6. Dotted or dashed lines show internal structures and other features that cannot be seen directly. The two cutter housing halves 30R, 30L are shown assembled together, with tabs 38 inserted into their corresponding detents 39.

Figure 8:
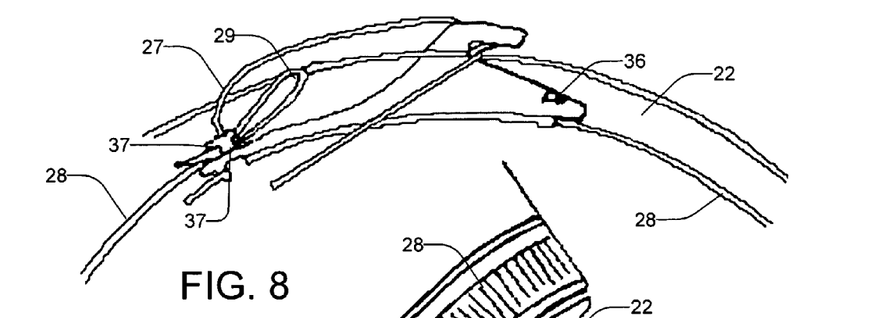
FIG. 8 is a side view of the assembled cutter housing attached to a portion of the annular elastic band, in accordance with the embodiment shown in FIG. 7.

FIG. 8 is a side view of the assembled cutter housing 30 attached to a portion of the annular elastic band 28, in accordance with the embodiment shown in FIG. 7. Attachment means 36, 37 are inserted through attachment holes 34, 35 in the cutter housing 30 and then attached to the elastic band 28. Typically, the two ends of the elastic band 28 are effectively joined by the attachment means 36, 37, with each attachment means 36, 37 being preferably inserted through both of the two ends of the elastic band 28. The free end 27 of the fishing line is shown threaded up through the rear attachment means 37 and then around and through the opening containing the cutting blade 32.

Figure 9:
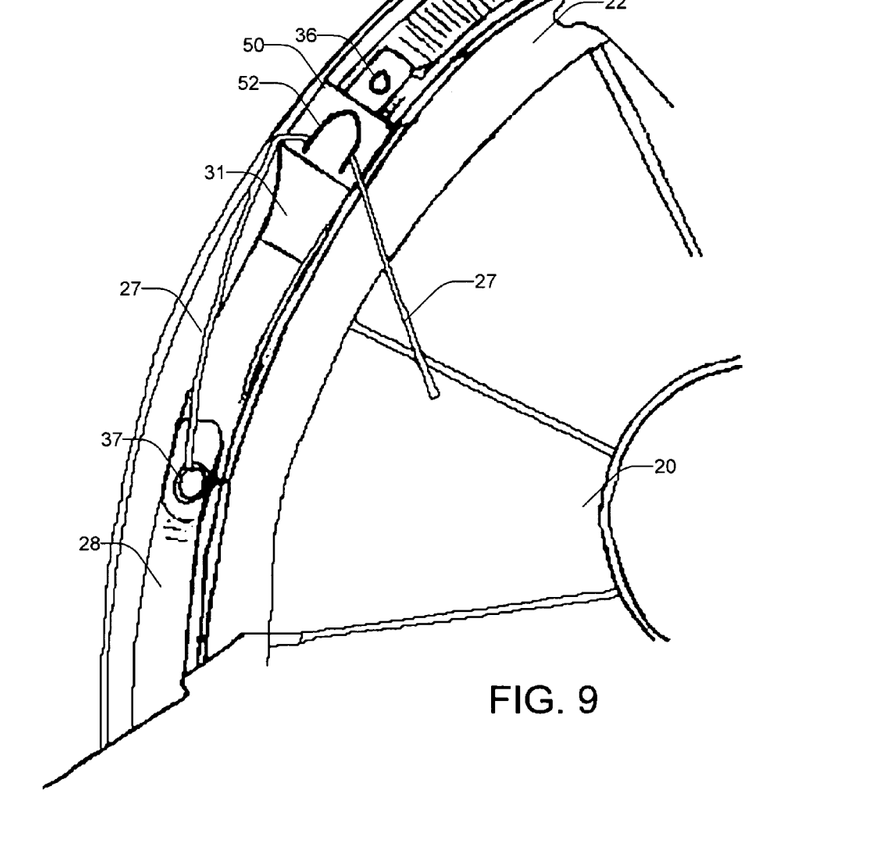
FIG. 9 is a partial perspective view of an assembled cutter housing attached to the annular elastic band and installed on a spool of fishing line, in accordance with another embodiment of the present invention.

FIG. 9 is a partial perspective view of an assembled cutter housing 50 attached to the annular elastic band 28 and installed on spool 20 of fishing line 26, in accordance with another embodiment of the present invention. The annular elastic band 28 is fitted to cover the fishing line 26 within the flanges or rims 22 of the spool 20. In this embodiment, the cutter housing 50 uses a cutting means 52 similar to that used for cutting dental floss. The free end 27 of the fishing line is shown fed through the rear attachment means 37 and then through the cutting means 52 in preparation for being cut to the desired length.

Figure 10:
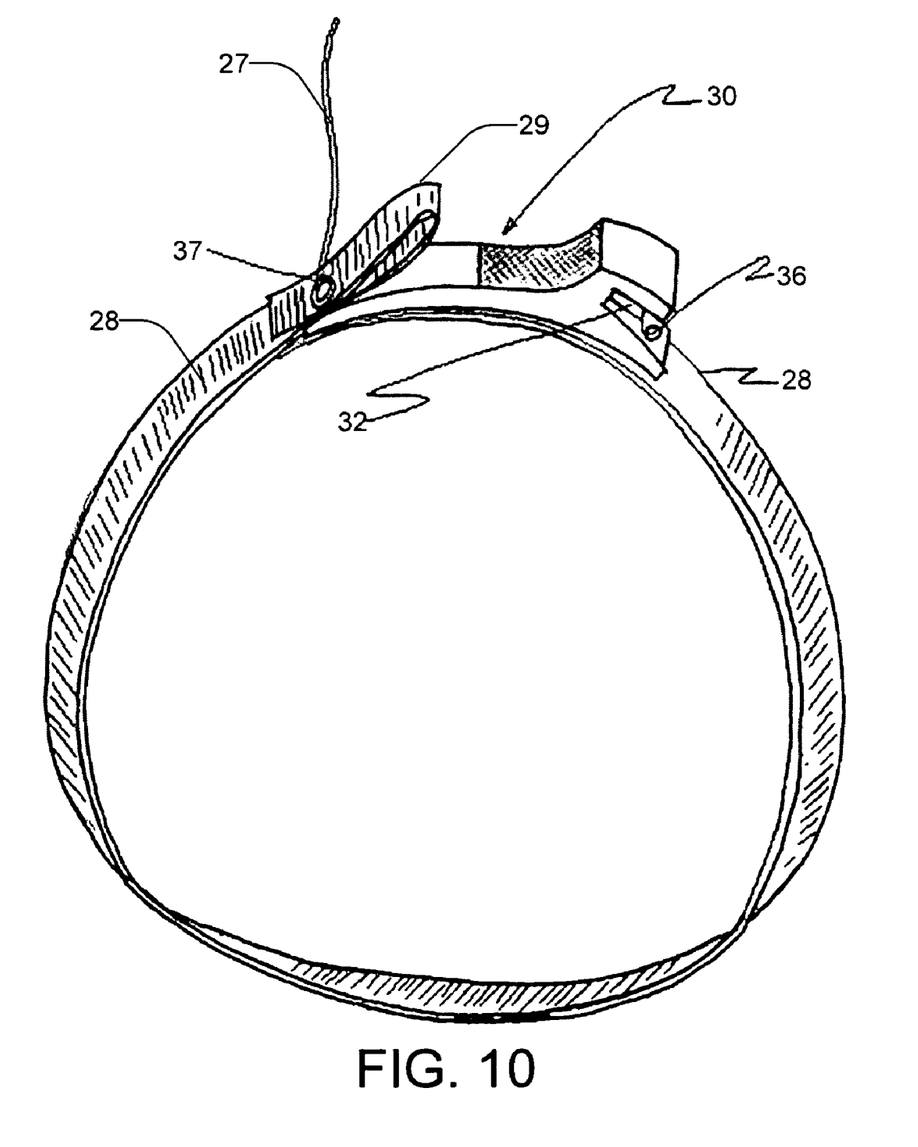
FIG. 10 is a perspective view of the assembled invention, in accordance with another embodiment of the present invention.

FIG. 10 is a perspective view of the assembled invention, in accordance with another embodiment of the present invention. This embodiment is similar to that shown in FIGS. 1-7 above, except that the portion of the cutter housing extending over the cutting blade 32 is rectangular, instead of rounded as shown in that previous embodiment. A loop 29 is shown formed in the annular elastic band 28 by doubling over one end of the elastic band 28. In this FIG., the doubled end of the elastic band is attached to the top of the cutter housing 30 by the rear attachment means 37, and the other end of the elastic band is attached to the bottom of the cutter housing 30 by both attachment means 36, 37. Thus, the rear attachment means 37 passes through the doubled end of the elastic band 28, the rear attachment hole 35 of the cutter housing 30, and then the other end of the elastic band 28, while the front attachment means 36 passes through the front hole 34 and the elastic band 28, inside the loop of where the elastic band 28 is attached to the cutter housing 30 by the rear attachment means 37.

Figures 11, 12:
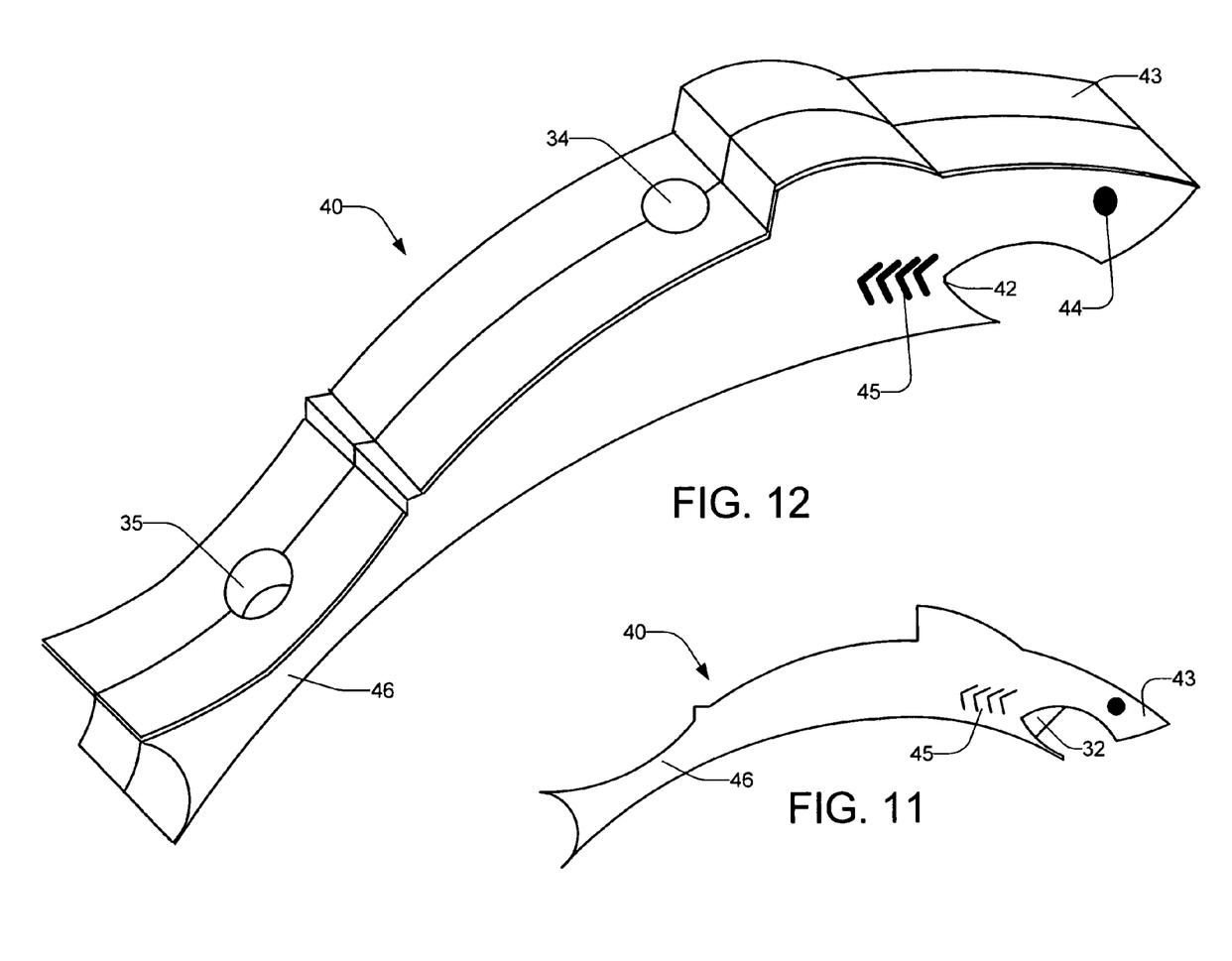
FIG. 11 is a side view of an assembled cutter housing, in accordance with another embodiment of the present invention.
FIG. 12 is a perspective view of the assembled cutter housing shown in FIG. 11.

FIG. 11 is a side view of an assembled cutter housing 40, in accordance with another embodiment of the present invention. In this embodiment, the cutter housing 40 is shaped like a shark, with the partially concealed cutting blade 32 located in the jaws 42 or mouth of the shark. In this embodiment, the "snout" 43 of the shark overhangs the blade 32, preventing injury, while still facilitating cutting of the fishing line 27.

FIG. 12 is a perspective view of an assembled cutter housing 40 shown in FIG. 11. Though not shown here, the shark shaped cutter housing 40 is attached similarly to the annular elastic strap, as shown above, except that the tail 46 of the shark may mitigate against use of a loop 29, as shown in FIGS. 8 and 10 above. The shark cutter housing 40 has gills 45, eyes 44, and a tail 46 to further the likeness of a shark.

Figures 13, 14:
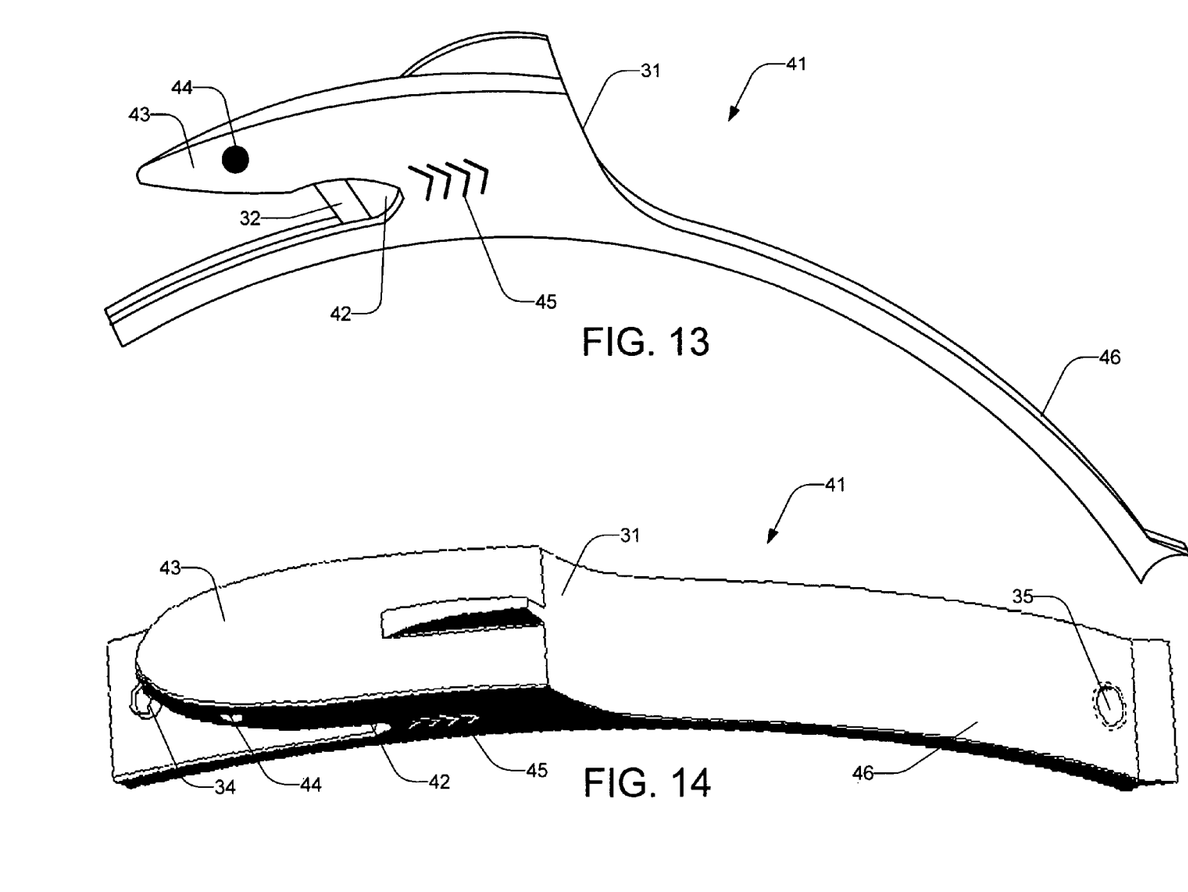
FIG. 13 is a side view of an assembled cutter housing, in accordance with another embodiment of the present invention.
FIG. 14 is a top view of an assembled cutter housing, in accordance with the embodiment shown in FIG. 13.

FIG. 13 is a side view of an assembled cutter housing 41, in accordance with another embodiment of the present invention. In this embodiment, the cutter housing 41 is shaped like a shark, with the partially concealed cutting blade 32 installed in the jaws 42 or mouth of the shark. In this embodiment, the "snout" 43 of the shark overhangs and partially conceals the blade 32, preventing injury, while still facilitating cutting of the fishing line 27. Though not shown here, the shark shaped cutter housing 41 is attached similarly to the annular elastic strap, as shown above, except that the tail 46 of the shark may mitigate against use of a loop 29, as shown in FIG. 8 above. The shark cutter 41 has gills 45, eyes 44, and a tail 46 to further the likeness of a shark. This shark cutter housing 41 is more stylized than the version 40 shown in FIGS. 11 and 12, with a long thin tail 46, somewhat similar to the cutter housing 30 embodiment shown in FIG. 1. Also, the front attachment hole 34 is located in front of the concealed cutting blade 32, instead of behind it, as shown in FIGS. 11 and 12.

FIG. 14 is a top view of an assembled cutter housing 41, in accordance with the embodiment shown in FIG. 13. This view shows the front 34 and rear 35 attachment holes, as well as a thumb rest 31.

Figure 15:
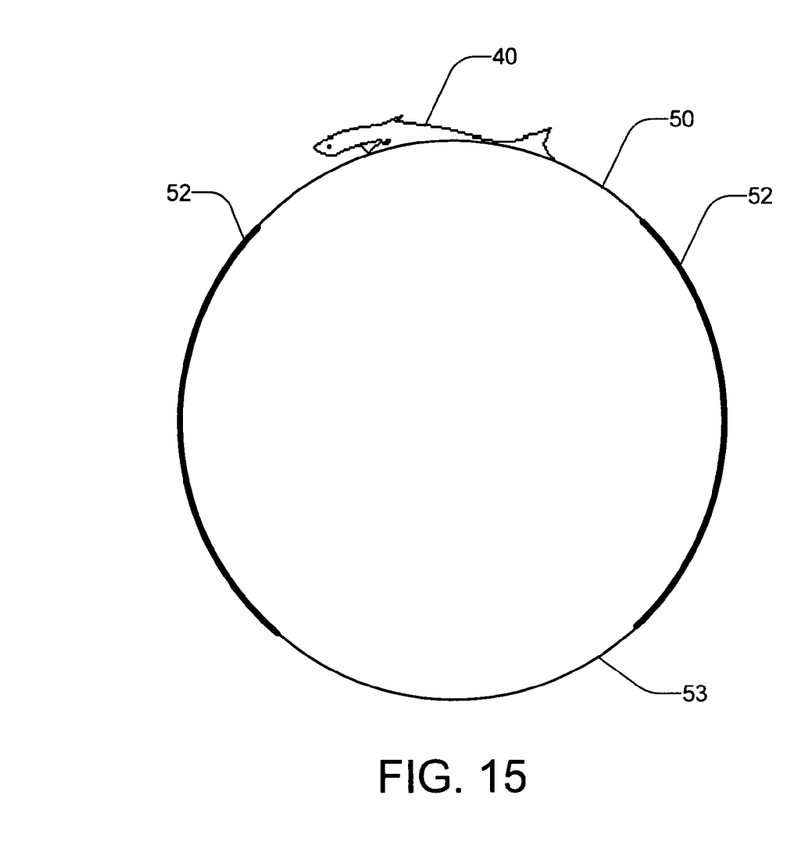
FIG. 15 is a side view of another embodiment of the present invention showing a cutter assembly attached to a band that is partially elastic and partially inelastic.

FIG. 15 is a side view of one embodiment of the present invention showing a cutter assembly 40 attached to a band 50 that is partially elastic 52 and partially inelastic 53. In this FIG., two elastic sections 52 and two non-elastic sections 53 of the band 50 are shown. This is illustrative only, and fewer or more sections of each type are also within the scope of the present invention. Other methods for the band to maintain tension on the fishing line are also within the scope of the present invention. A shark shaped cutter housing 40 is shown in this FIG., but other types of cutter housings 30 are also within the scope of this invention, including those shown in FIGS. 1-10 and 13-14.

Figure 16:
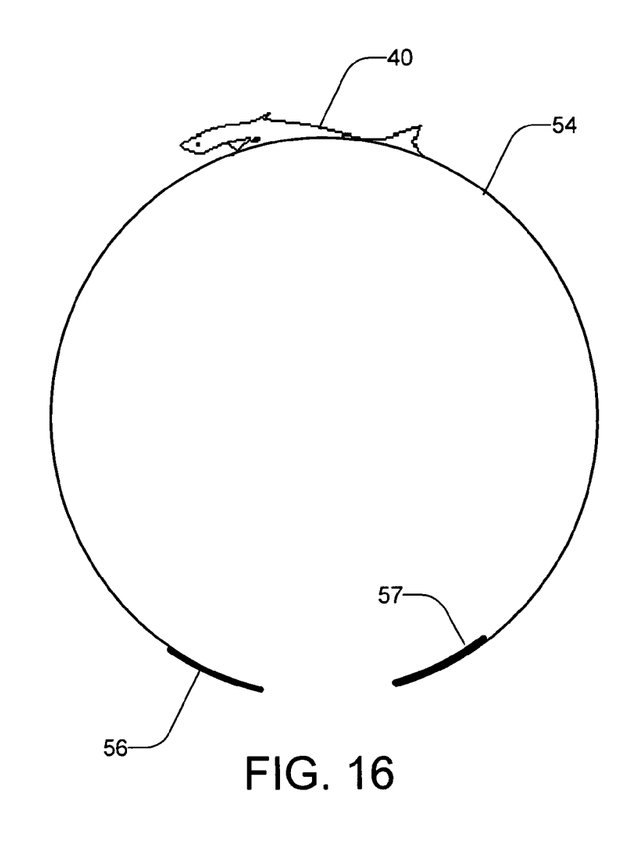
FIG. 16 is a side view of another embodiment of the present invention showing a cutter assembly attached to a band that can be closed with a hook and loop fastening system.

FIG. 16 is a side view of one embodiment of the present invention showing a cutter assembly 40 attached to a band 54 that can be closed with a hook 56 and loop 57 fastening system. The band 54 is preferably at least partially elastic, but may be inelastic. In the later case, the fisherman utilizing this invention may wish to periodically tighten the closure to maintain a tension and a snug fit over the fishing line. Other fastening means are also within the scope of the present invention, such as friction belt closures, tongue and hole, clasps, snaps, and hooks and eyelets. A shark shaped cutter housing 40 is shown in this FIG., but other types of cutter housings 30 are also within the scope of this invention, including those shown in FIGS. 1-10 and 13-14.

Those skilled in the art will recognize that modifications and variations can be made without departing from the spirit of the invention. Therefore, it is intended that this invention encompass all such variations and modifications as fall within the scope of the appended claims.

What is claimed is:

1. A fishing line control system comprising:
    a continuous band capable of fitting completely around a spool of fishing line fully between flanges of the spool of fishing line and providing tension on the fishing line; and
    a cutter housing attached to the band, said housing comprising:
        a means for cutting fishing line.

2. The fishing control system in claim 1 wherein the cutter housing further comprises:
    a pair of attachment holes for attaching the cutter housing to the band.

3. The fishing control system in claim 2 wherein:
    the cutter housing is attached to the band with a pair of hollow rivets disposed through the pair of attachment holes.

4. The fishing control system in claim 3 wherein:
    the band has a first end and a second end removably attachable together, and the band is at least partially elastic.

5. The fishing control system in claim 2 wherein:
    the cutter housing is attached to the band with a pair of crimped metal tubes disposed through the pair of attachment holes.

6. The fishing control system in claim 1 wherein the cutter housing further comprises: a thumb rest.

7. The fishing control system in claim 1 wherein:
    the cutter housing is constructed of plastic; and
    the cutter housing is formed from two halves.

8. The fishing control system in claim 1 wherein:
    the means for cutting the fishing line includes a metal plate having a stamped and raised U-shaped portion.

9. The fishing control system in claim 1 wherein:
    the means for cutting the fishing line includes a vertically oriented blade.

10. The fishing control system in claim 1 wherein:
    the band is elastic, annular, and fully covering the spool of fishing line between the flanges.

11. A method of controlling fishing line on a spool of fishing line comprising:
    providing a continuous band for installation around the spool of fishing line fully within flanges of the spool and capable of providing tension upon the fishing line;
    providing a cutter housing comprising a means for cutting the fishing line; and
    attaching the cutter housing to the band.

12. The method in claim 11 wherein the cutter housing further comprises:
    a plurality of attachment holes for attaching the cutter housing to the band.

13. The method in claim 12 which further comprises:
    installing the band with the attached cutter housing around the fishing line on the spool of fishing lines, and
    feeding a free end of the fishing line from the spool of fishing line up through a one of the plurality of attachment holes.

14. The method in claim 12 wherein:
    attaching the cutter housing utilizes at least one of a set consisting of hollow rivets and crimped metal tubes inserted through the plurality of attachment holes and the band.

15. The method in claim 14 wherein:
    attaching the cutter housing utilizes a hollow means for attachment that allows a free end of the fishing line to be fed through the means of attachment, the band, and one of the attachment holes.

16. The method in claim 11 wherein the cutter housing further comprises:
    a thumb rest.

17. The method in claim 11 wherein providing the cutter housing comprises:
    constructing a first cutter housing half and a second cutter housing half from plastic;
    inserting the means for cutting the fishing line between the first cutter housing half and the second cutter housing half; and
    attaching the first cutter housing half to the second cutter housing half.

18. The method in claim 11 wherein:
    the means for cutting the fishing line includes a metal plate having a stamped and raised U-shaped portion.

19. The method in claim 11 wherein:
    the means for cutting the fishing line includes a vertically oriented blade at least partially hidden by a portion of the cutter assembly.

20. The method in claim 11 wherein:
    the band is elastic, annular, and sized to fit in tension around and fully covering the spool of fishing line within the flanges.

* * * * *